A. HORMEL.
ANTISKIDDING DEVICE FOR AUTOMOBILES.
APPLICATION FILED NOV. 18, 1909.

972,766.

Patented Oct. 11, 1910.

Witnesses:

Inventor
August Hormel
By his Attorney
Arthur E. Zimper

UNITED STATES PATENT OFFICE.

AUGUST HORMEL, OF NEW YORK, N. Y.

ANTISKIDDING DEVICE FOR AUTOMOBILES.

972,766.

Specification of Letters Patent. Patented Oct. 11, 1910.

Application filed November 18, 1909. Serial No. 528,650.

*To all whom it may concern:*

Be it known that I, AUGUST HORMEL, a citizen of the United States, and a resident of New York city, Manhattan, in the county of New York and State of New York, have invented certain new and useful Improvements in Antiskidding Devices for Automobiles, of which the following is a specification.

This invention relates to improved means for preventing the skidding or swerving of the rear wheels of automobiles and similar vehicles. For this purpose, a trailer is suitably connected to the vehicle near the rear end thereof, the construction being such that a lateral movement of the rear wheels will cause the trailer to be automatically forced against the ground, so as to effectively check said lateral movement.

Figure 1:
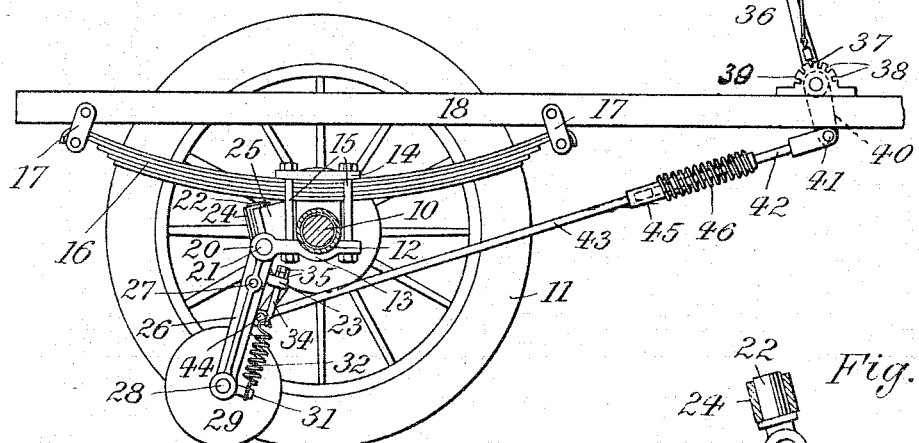
Figure 4:
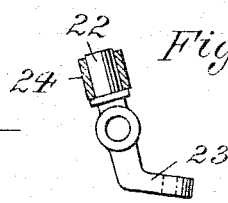

In the accompanying drawing: Figure 1 is a sectional side view of part of an automobile embodying my invention, Fig. 2 a rear view, partly broken away, of Fig. 1, Fig. 3 a detail of the bracket, Fig. 4 a detail of the trailer-actuating lever, and Fig. 5 a view similar to Fig. 1 showing a modified form of my invention.

Figure 2:
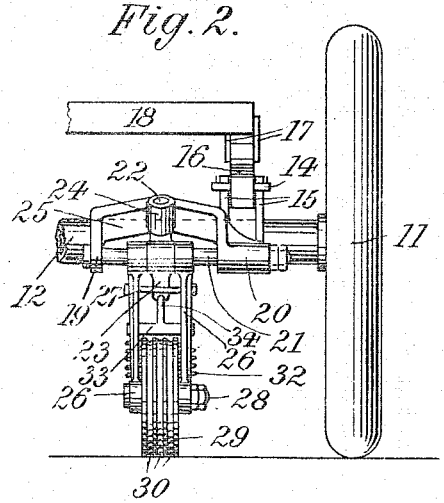
Figure 3:
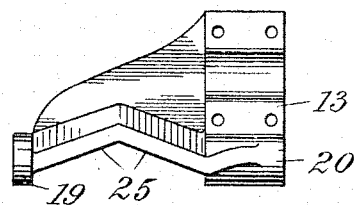

The rear axle 10 of the automobile, carrying driving wheels 11, is inclosed within a tubular casing 12, as usual. To the latter is secured by clamp plates 13, 14 and screws 15, a spring 16, the outer ends of which are, by links 17, connected to the automobile frame 18. Clamp plate 13 is shown to be provided with a pair of alined bearings 19, 20, adapted for the reception of a fixed arbor 21. Upon the latter is rotatably mounted a two-arm lever 22, 23, the upper arm 22 of which carries an antifriction roller 24. This roller engages a V-shaped guide 25 extending intermediate bearings 19, 20 (Figs. 2 and 3). Upon arbor 21 are slidably mounted a pair of arms 26 that straddle lever 22 23, said arms being connected to each other by a screw bolt 27. The free ends of arms 26 are connected by an axle 28, upon which a preferably metallic friction wheel or trailer 29 is loosely mounted. The latter is grooved at its circumference as at 30 so as to permit the trailer to obtain a firm grip upon the supporting ground. At their free ends, arms 26 are further provided with forwardly extending lugs 31, to which the lower ends of springs 32 are secured. The upper ends of these springs are connected to a cross arm 33 forming part of a pin or rod 34 which is, by nuts 35, secured to the lower arm 23 of the lever hereinabove referred to.

For controlling trailer 29, a hand lever 36 is pivoted to frame 18 which may be locked in position by a bolt 37 adapted to enter corresponding notches 38 of a fixed sector 39. To the lower arm 40 of hand lever 36 is fulcrumed at 41 one end of a sectional link 42, 43, the other end of which is pivoted to one of the arms 26 as at 44. Link section 42 is telescoped by a corresponding socket 45 of section 43, a spring 46 tending to contract parts 42, 43.

Figure 5:
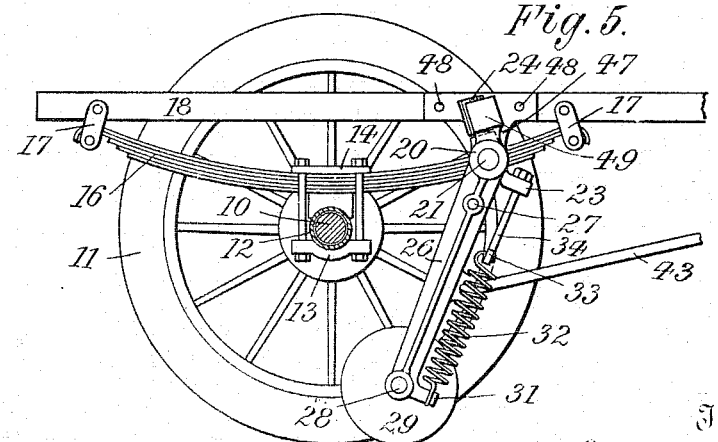

In lieu of pivotally connecting arms 26 to the casing 12 of the rear axle, said arms may be operatively connected to the frame 18 of the automobile as illustrated in Fig. 5. In this case a bracket 47 is, by bolts 48, secured to frame 18 said bracket having a V-shaped guide 49 that corresponds in all respects to the guide 25 shown in Figs. 1, 2 and 3. The remainder of the mechanism is constructed as above described.

It will be seen that by tilting lever 36 in the direction of the arrow (Fig. 1), the trailer may be raised off the ground so as to be rendered inoperative when there is no danger of skidding. When the roads, however, are wet and slippery, lever 36 is tilted backward, so as to yieldingly force trailer 29 against the ground owing to the interpolation of spring 46 between link sections 42, 43. When wheels 11, swerve laterally, trailer 29 will not participate in this axial movement of said wheels because its grooved surface insures a firm grip on the ground. But as V-shaped guide 25 participates in the lateral movement of wheels 11, the upper arm 22 of lever 22, 23 will be swung backward, thereby raising pin 34. Springs 32 being thus placed under tension, will tend to swing arms 26 forward and cause a corresponding longitudinal movement of the trailer, to increase the friction between trailer 29 and the supporting ground. In this way, the resistance of the grooved trailer against lateral movement is increased, it being evident that the greater is the tendency of the rear wheels to swerve sidewise, the greater becomes the pressure with which the trailer is forced against the ground, so as to effectively check the objectionable skidding of the automobile.

I claim:

1. A device of the character described, comprising a vehicle body, a suspended trailer adapted to swing in a longitudinal direction and laterally displaceable relatively to said body, and means for increasing the frictional contact between ground and trailer by such lateral displacement.

2. A device of the character described, comprising a vehicle body, a suspended trailer adapted to swing in a longitudinal direction and laterally displaceable relatively to said body, and means for progressively increasing the frictional contact between ground and trailer by a progressive relative lateral displacement between body and trailer.

3. A device of the character described, comprising a vehicle body, an inclined guide carried thereby, a suspended trailer adapted to swing in a longitudinal direction and laterally displaceable relatively to said body, and a member extending upwardly from the trailer into engagement with the inclined guide.

4. In a device of the character described, an arbor and a V-shaped guide combined with a two-arm lever loosely embracing the arbor and engaging the guide, an arm loosely mounted on the arbor and carrying a trailer, and a spring interpolated between said lever and arm.

5. In a device of the character described, an arbor and a V-shaped guide combined with a two-arm lever embracing the arbor and engaging the guide, a pair of arms loosely mounted on the arbor and straddling the lever, a trailer carried by the arms, lugs formed on the arms, and springs interpolated between the lever and said lugs.

6. In a device of the character described, an arbor and a V-shaped guide combined with a two-arm lever loosely embracing the arbor and engaging the guide, a pair of arms loosely mounted on the arbor and straddling the lever, a trailer carried by the arms, lugs formed on the arms, a rod engaging the lever, a cross-arm integral with the rod, and springs interpolated between said cross-arm and lugs.

7. In a device of the character described, an arbor and a V-shaped guide combined with a two-arm lever loosely embracing the arbor and engaging the guide, an arm loosely mounted on the arbor and carrying a trailer, a spring interpolated between said lever and arm, and means for raising the arm.

8. In a device of the character described, an arbor and a V-shaped guide combined with a two-arm lever loosely embracing the arbor and engaging the guide, an arm loosely mounted on the arbor and carrying a trailer, a spring interpolated between said lever and arm, a spring-influenced sectional link pivoted to the arm, and a hand lever fulcrumed to said link.

Signed at New York city, in the county of New York and State of New York this 16th day of November, A. D. 1909.

AUGUST HORMEL.

Witnesses:
AMBROSE F. STOLZENBURGER,
ARTHUR E. ZUMPE.